United States Patent
Peters et al.

(10) Patent No.: US 12,298,189 B2
(45) Date of Patent: May 13, 2025

(54) AXLE TEMPERATURE MONITORING SYSTEM

(71) Applicants: Jacob Peters, Leamington (CA); Johan Redecop, Leamington (CA)

(72) Inventors: Jacob Peters, Leamington (CA); Johan Redecop, Leamington (CA)

(*) Notice: Subject to any disclaimer, the term of this patent is extended or adjusted under 35 U.S.C. 154(b) by 102 days.

(21) Appl. No.: 18/230,015

(22) Filed: Aug. 3, 2023

(65) Prior Publication Data

US 2025/0044167 A1    Feb. 6, 2025

(51) Int. Cl.
*G01K 13/08*    (2006.01)
*B60B 35/18*    (2006.01)
*G07C 5/08*    (2006.01)

(52) U.S. Cl.
CPC .......... *G01K 13/08* (2013.01); *G07C 5/0825* (2013.01); *B60B 35/18* (2013.01); *G01K 2215/00* (2013.01)

(58) Field of Classification Search
CPC .. G01K 13/08; G01K 2215/00; G07C 5/0825; B60B 35/18
See application file for complete search history.

(56) References Cited

U.S. PATENT DOCUMENTS

| | | |
|---|---|---|
| 6,546,892 B2 | 4/2003 | Kelly, Jr. |
| 6,892,778 B2 | 5/2005 | Henning |
| 7,652,562 B2 | 1/2010 | White |
| 8,223,006 B2 | 7/2012 | Wilson |
| 8,910,683 B2 | 12/2014 | Henning |
| 10,913,471 B2 | 2/2021 | Pinkerton |
| D920,138 S | 5/2021 | Kuwashiro |
| 2021/0332849 A1* | 10/2021 | Gravell ............... B60C 23/0408 |

FOREIGN PATENT DOCUMENTS

WO    WO2012015669    2/2012

* cited by examiner

*Primary Examiner* — Omeed Alizada

(57) ABSTRACT

An axle temperature monitoring system for monitoring the temperature of an axle spindle and warning a user of excessively high temperature readings includes a sleeve that enwraps the axle spindle with a temperature sensor installed within the sleeve near the inside and outside bearings of the axle spindle. The temperature sensor communicates wirelessly with a central processing unit that activates a warning light when the temperature exceeds the safe operating temperature threshold. The warning light may be installed on an exterior surface of the vehicle, for example on the front driver's side of a trailer, so that the user can see the warning light from the driver's seat. The driver can then slow down and stop the vehicle until the spindles cool down.

19 Claims, 6 Drawing Sheets

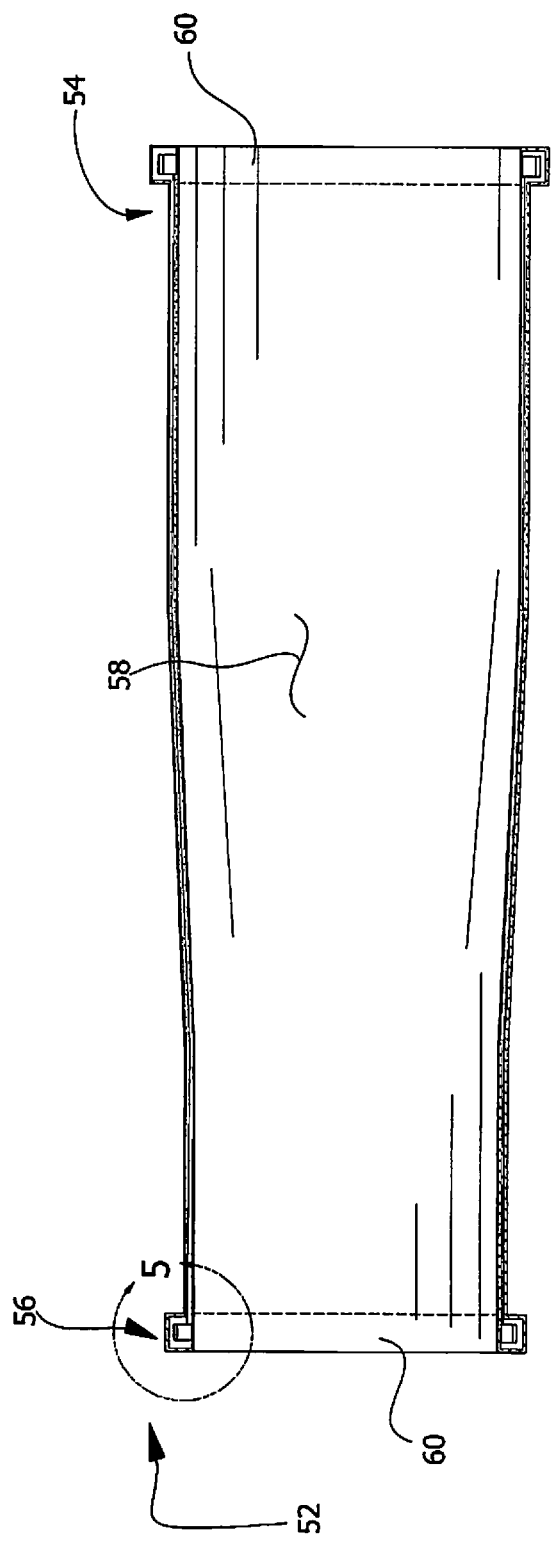
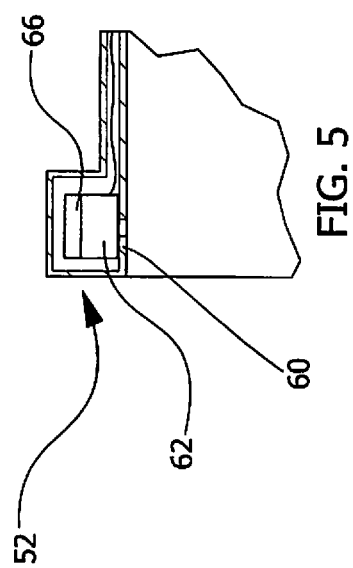
FIG. 4
FIG. 5

AXLE TEMPERATURE MONITORING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to vehicle temperature warning systems and more particularly pertains to a new vehicle temperature warning system for monitoring the temperature of an axle spindle and warning a user of excessively high temperature readings.

(2) Description of Related Art Including Information Disclosed Under 37 CFR 1.97 and 1.98

The prior art relates to vehicle temperature warning systems. Specifically, the prior art discloses temperature monitoring systems for vehicle wheel end assemblies that alert a driver or user of dangerously high temperatures. Some prior art references disclose warning systems which activate lights if excessive heat is detected in the axle or wheel end assemblies. However, many of these prior art references disclose warning systems which are integrated into the wheel end assemblies and cannot be affordably retrofitted onto other vehicles.

BRIEF SUMMARY OF THE INVENTION

An embodiment of the disclosure meets the needs presented above by generally comprising a temperature monitoring mechanism capable of monitoring a temperature of an axle spindle and of alerting a user when the temperature exceeds a safe operating temperature. Example embodiments include a sleeve that enwraps the axle spindle with a temperature sensor installed within the sleeve near the inside and outside bearings of the axle spindle. The temperature sensor communicates wirelessly with a central processing unit that activates a warning light when the temperature exceeds the safe operating temperature threshold. The warning light may be installed on an exterior surface of the vehicle, for example on the front driver's side of a trailer, so that the user can see the warning light from the driver's seat. The driver can then slow down and stop the vehicle until the spindles cool down.

There has thus been outlined, rather broadly, the more important features of the disclosure in order that the detailed description thereof that follows may be better understood, and in order that the present contribution to the art may be better appreciated. There are additional features of the disclosure that will be described hereinafter, and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 4 is a cross-sectional view of an embodiment of the disclosure.

FIG. 5 is a detail view of an embodiment of the disclosure.

DETAILED DESCRIPTION OF THE INVENTION

Figure 1:
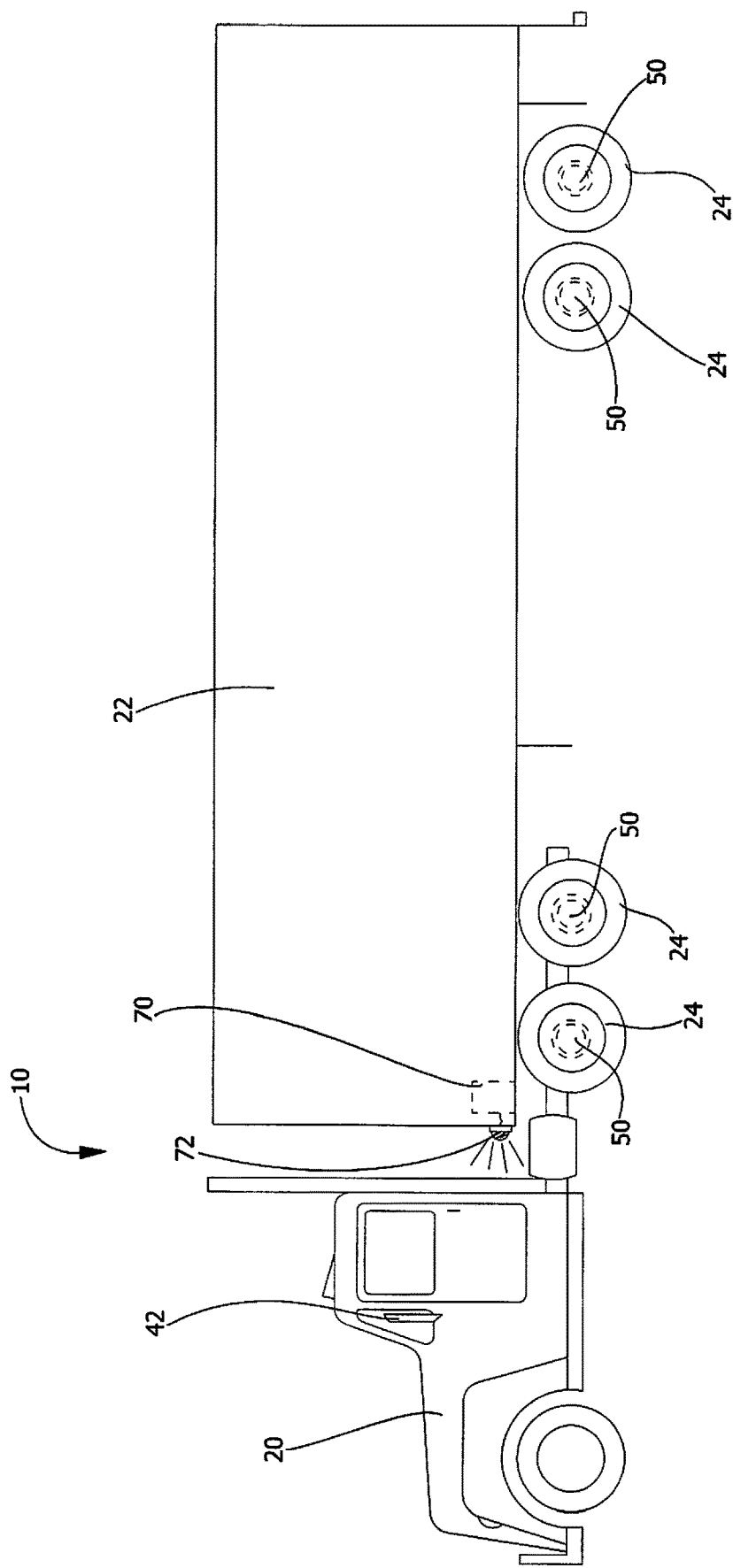
FIG. 1 is a side in-use view of an axle temperature monitoring system according to an embodiment of the disclosure.
Figure 2:
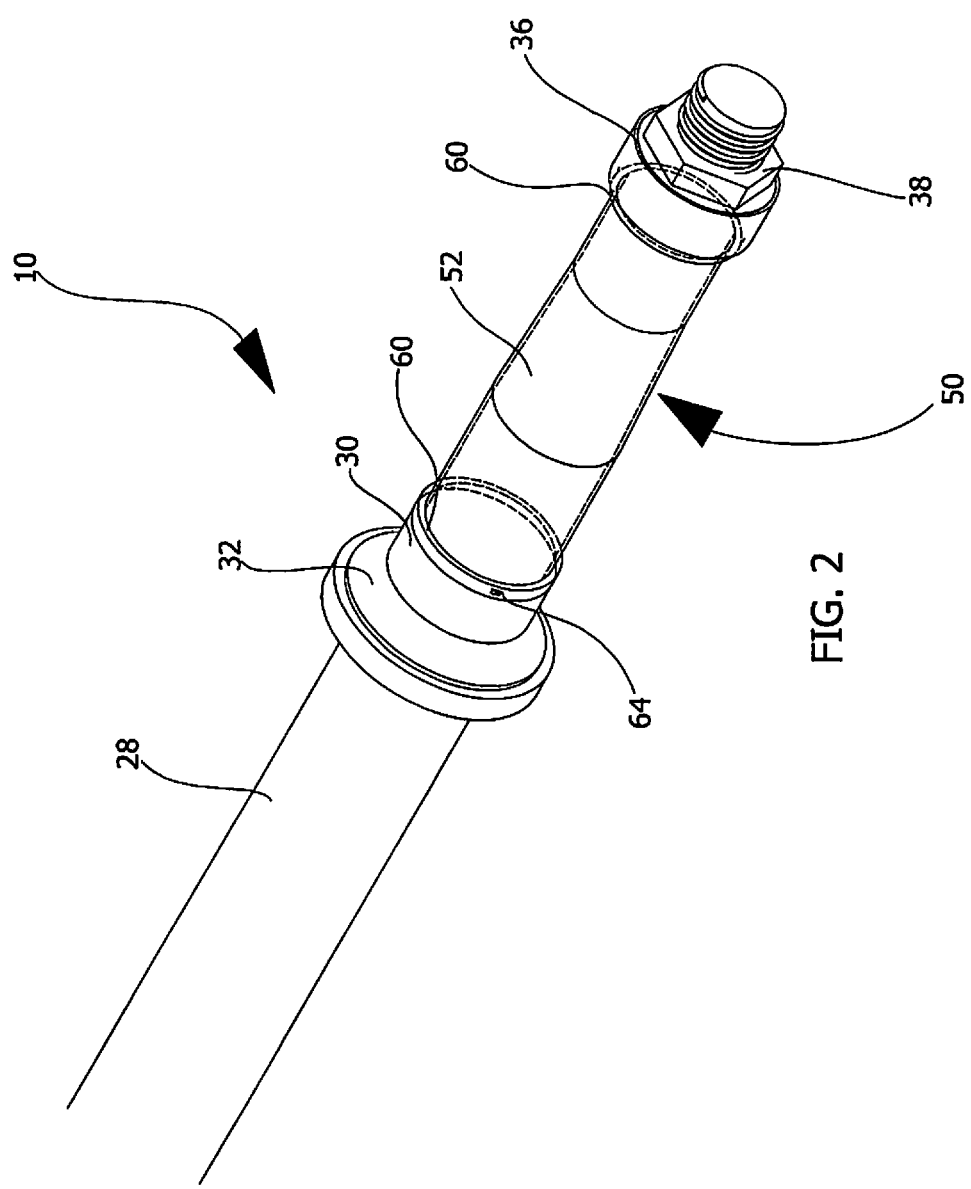
FIG. 2 is a top isometric view of an embodiment of the disclosure.

With reference now to the drawings, and in particular to FIGS. 1 through 7 thereof, a new vehicle temperature warning system embodying the principles and concepts of an embodiment of the disclosure and generally designated by the reference numeral 10 will be described.

As best illustrated in FIGS. 1 through 7, the axle temperature monitoring system 10 generally comprises a temperature monitoring mechanism 50 capable of monitoring a temperature of an axle spindle 26 and of alerting a user when the temperature exceeds a safe operating temperature. Example embodiments include a sleeve 52 that enwraps the axle spindle 26 with a temperature sensor 60 installed within the sleeve 52 near the inside 30 and outside 34 bearings of the axle spindle 26. The temperature sensor 60 communicates wirelessly with a central processing unit 68, 70 that activates a warning light 72 when the temperature exceeds the safe operating temperature threshold. The warning light 72 may be installed on an exterior surface of the vehicle, for example on the front driver's side of a trailer 22, so that the user can see the warning light 72 from the driver's seat. The driver can then slow down and stop the vehicle until the spindles 26 cool down.

One embodiment is shown a system 10 configured for use with a vehicle 20 having a trailer 22 with a plurality of wheels 24. Each of the plurality of wheels 24 is rotatably mounted to an axle spindle 26. Each axle spindle may include an inside bearing 30 that is proximate to an axle 28. An inside bearing ring 32 may be mounted to the inside bearing 30 and the axle 28, such that the inside bearing ring 32 covers at least a portion of the axle spindle 26 and the axle 28. An outside bearing 34 is generally opposite the inside bearing 30, proximate to the respective one of the plurality of wheels 24. A medial portion 40 extends between the inside bearing 30 and the outside bearing 34. An outside bearing ring 36 may be mounted to the outside bearing 34, covering at least a portion of the outside bearing 34. A retaining nut 38 is affixed to the outside bearing 34 proximate to the wheel 24 and opposite the outside bearing ring 36 from the medial portion 40.

A temperature monitoring mechanism 50 is installed on the vehicle 20 or the trailer 22 and is configured to monitor the temperature of each axle spindle 26. The mechanism 50 may be further configured to alert a user of a temperature greater than a threshold temperature. The threshold temperature should be a safe operating temperature for the axle spindle 26, or a temperature at which the axle spindle 26 will not overheat and damage to the various components will not occur. In some example embodiments, the threshold temperature is at least greater than 180° F. Other embodiments may have different threshold temperatures, for example because damage to the axle spindles 26 of a semi-truck trailer 22 can occur at temperatures ranging between 200° F. and 250° F.

The temperature monitoring mechanism 50 generally includes a sleeve 52 having an inner end 54 opposite an outer end 56. The sleeve 52 is configured to removably receive the axle spindle 26 such that the medial portion 40 is covered by the sleeve 52. In embodiments such as that shown in FIG. 4, the sleeve 52 has a tapered tubular body 58, wherein the inner end 54 has a diameter that is larger than the diameter of the outer end 56. The inner end 54 is proximate to the inside bearing 30 when the axle spindle 26 is within the sleeve 52. The outer end 56 is proximate to the outside bearing 34 when the axle spindle 26 is within the sleeve 52.

Figure 3:
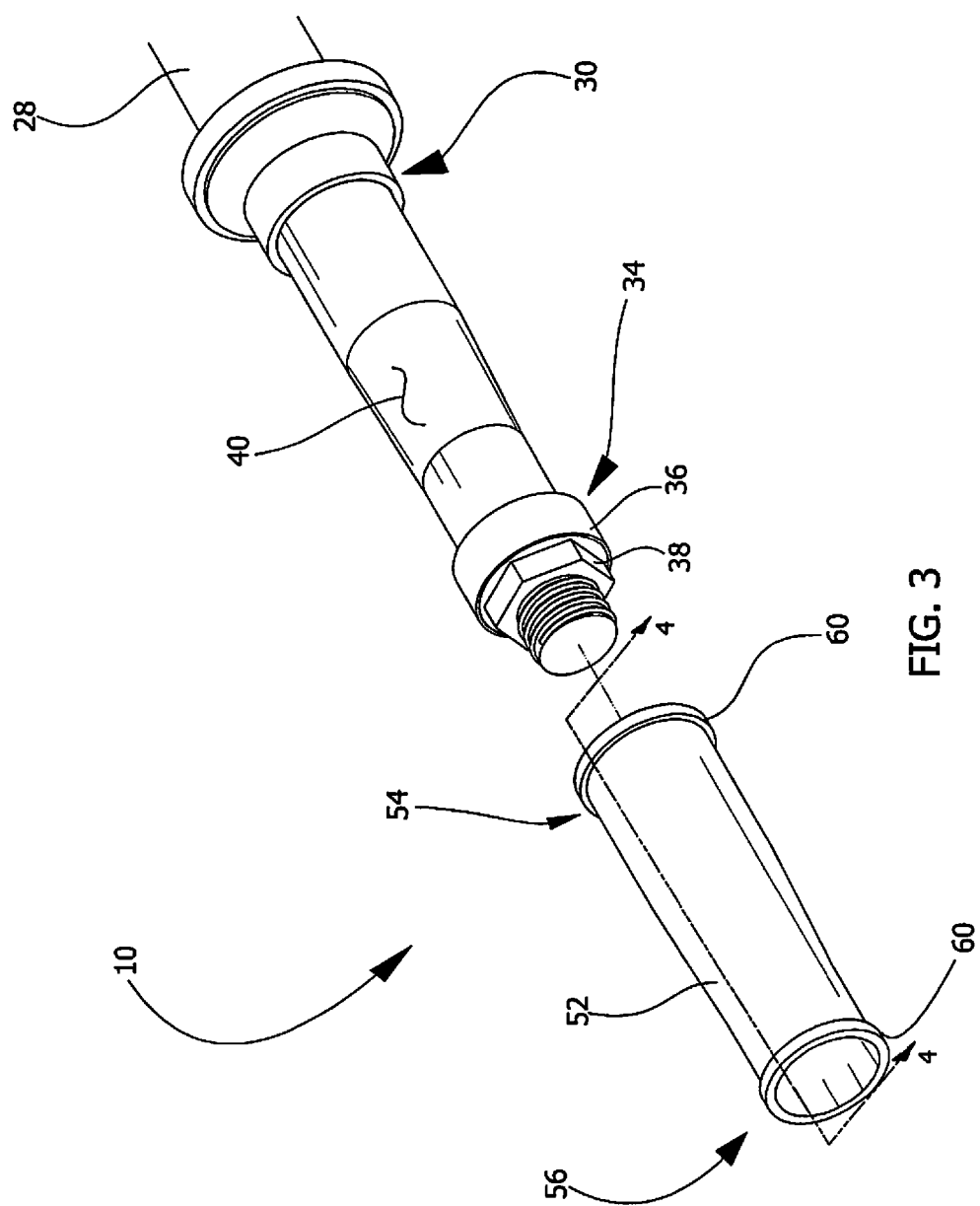
FIG. 3 is an isometric exploded view of an embodiment of the disclosure.
Figure 6:
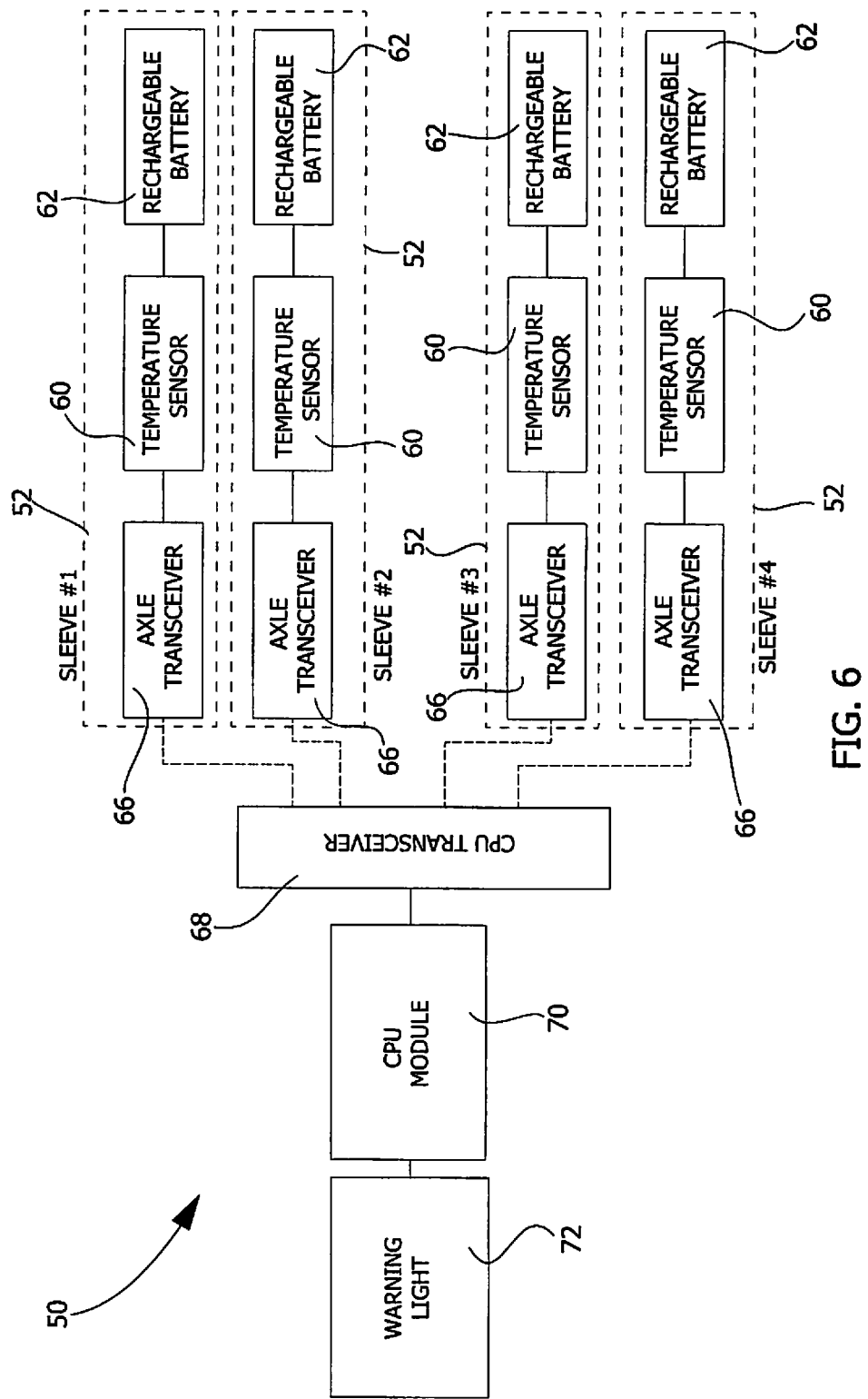
FIG. 6 is a block diagram view of an embodiment of the disclosure.
Figure 7:
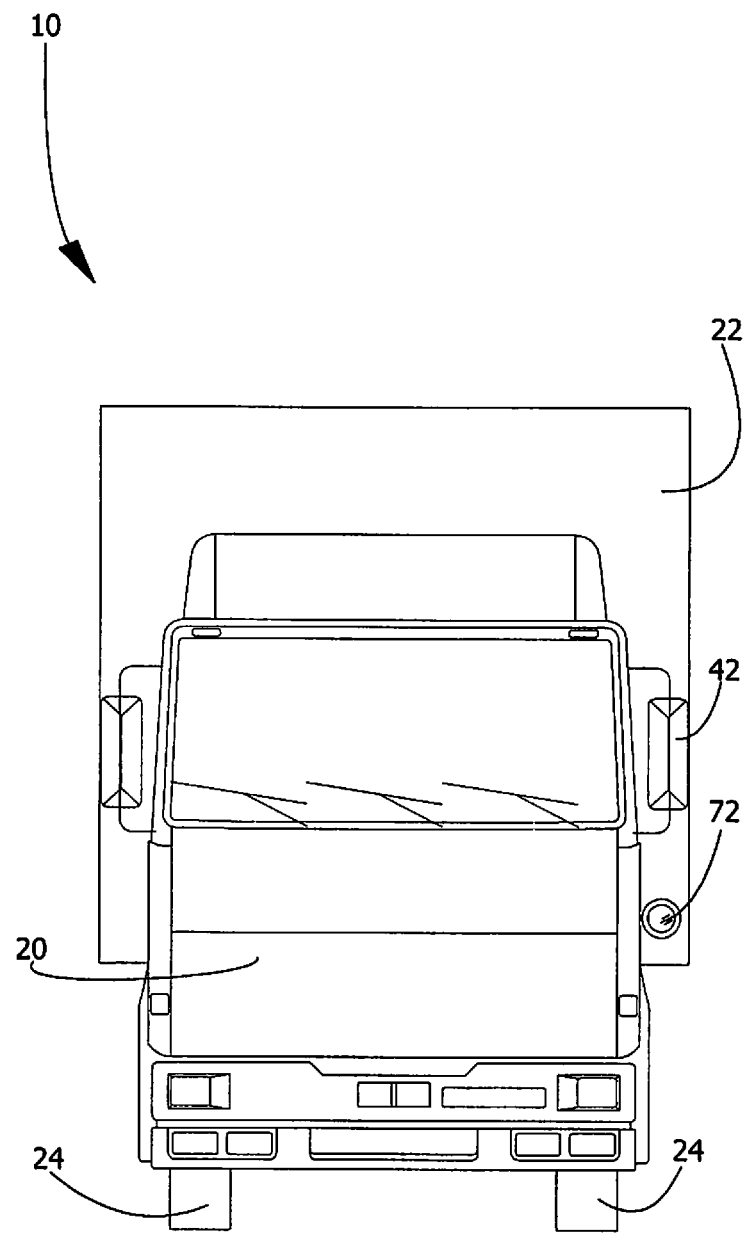
FIG. 7 is a front in-use view of an embodiment of the disclosure.

A temperature sensor 60 may be affixed to the sleeve 52. For example, the mechanism 50 may include a pair of temperature sensors 60, wherein a first of the pair of temperature sensors 60 is affixed to the inner end 54 and a second of the pair of temperature sensors 60 is affixed to the outer end 56. In some embodiments, each of the pair of temperature sensors 60 is a ring, as shown in FIG. 3. The temperature sensor ring 60 wraps around a circumference of a corresponding one of the inner end 54 and the outer end 56. This configuration allows the temperature sensors 60 to monitor the temperature of the axle spindle 26 across the entire circumference of the inside bearing 30 and outside bearing 34.

A battery 62 is electrically coupled with each of the temperature sensors 60. For example, a rechargeable battery 62 may be used and mounted within the sleeve 52 proximate to each of the pair of temperature sensor rings 60. The rechargeable battery 62 may be configured to recharge with a magnetic charging assembly, a charging port, or any other reasonable means. In embodiments such as those shown in FIG. 2, a charging port 64 may be coupled with the rechargeable battery 62. In this example, the charging port 64 is positioned in the sleeve 52 and is exposed within the inner end 54. However, the charging port 64 may also be exposed within the outer end 56 or another convenient location along the tapered tubular body 58. Alternatively, a non-rechargeable, replaceable battery 62 may be used.

An axle transceiver 66 is mounted within the sleeve 52. The axle transceiver 66 is coupled with the battery 62 and is in electronic communication with each of the temperature sensors 60. A central processing unit transceiver 68 is in electronic communication with the axle transceiver 66. In some embodiments, the central processing unit transceiver 68 communicates wirelessly with each axle transceiver 66. A central processing unit module 70 is in electronic communication with the central processing unit transceiver 68. Again, the central processing unit module 70 may communicate wirelessly with the central processing unit transceiver 68.

A warning light 72 is in electronic communication with the central processing unit module 70. In some embodiments, the warning light 72 is mounted to a front left exterior surface of the trailer 22, such that the warning light is visible to the user through a left side mirror 42 of the vehicle 20 when the user is in a driver's seat of the vehicle 20. However, the warning light 72 may be installed in any convenient location on the trailer 22 or the vehicle 20 where the user can see the warning light 72.

The central processing unit module 70 is configured to activate the warning light 72 when at least one of the temperature sensors 60 measures an excessive temperature. The excessive temperature will be any temperature reading exceeding the threshold temperature. As stated above, the threshold temperature may be set based on a safe operating temperature and should be lower than the temperature at which the axle spindles 26 may overheat or become damaged. The central processing unit module 70 may be further configured to deactivate the warning light 72 when all of the temperature sensors 60 measure a safe operating temperature, which is below the threshold temperature.

In use, a sleeve 52 may be installed over each axle spindle 26 of the vehicle 20 or trailer 22. In the example provided in FIG. 1, each of the four axles 28 of the semi-truck trailer 22 would include two axle spindles 26. Accordingly, a sleeve 52 may enwrap each of these eight axle spindles 26. Smaller trailers 22 may have fewer axles 28 and, accordingly, fewer axle spindles 26. Such an example is contemplated by FIG. 6, which shows a system having four sleeves 52, which would correspond to four axle spindles 26 and two axles 28. A sleeve 52 may be fitted over an axle spindle 26 as an after-market or retrofitted addition to the vehicle 20 or trailer 22. Thus, the mechanism 50 may be used in any existing vehicle 20 and trailer 22 assemblies, whether new or used.

Regardless of the precise number of axles 28 and axle spindles 26, a sleeve 52 may be fitted over each axle spindle 26 of the trailer 22. The temperature sensors 60 can measure the temperature around the inside bearing 30 and the outside bearing 34 of each axle spindle 26. The axle transceiver 66 of each sleeve 52 communicates with each respective temperature sensor 60 and with the central processing unit transceiver 68. The central processing unit transceiver 68 may be installed within the trailer 22, as shown in FIG. 1. Thus, the axle transceivers 66 may be configured to communicate wirelessly with the central processing unit transceiver 68. The central processing unit transceiver 68 communicates with the central processing unit module 70. The central processing unit module 70 is in electronic communication with the warning light 72. In the embodiments shown in FIGS. 1 and 7, the warning light 72 is affixed to a lower, front, left-hand exterior of the trailer 22. In this position, the warning light 72 is visible through the driver's side mirror 42 of the vehicle 20. The warning light may be affixed to any surface visible to the user, such as the lower, front, right-hand exterior of the trailer 22 or within the cab of the vehicle 20. When at least one of the temperature sensors 60 measures a temperature exceeding the threshold, safe operating temperature, the central processing unit module 70 turns on the warning light 72. The user can then slow down, or stop, and wait for the axle spindles 26 to cool off before continuing. This early detection warning system can therefore prevent overheating, damage to the axle 28 components, and vehicular accidents.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

We claim:

1. A temperature sensor system, comprising:
    a trailer having a plurality of axle spindles, each of the plurality of axle spindles including:
        an inside bearing being proximate an axle;
        an outside bearing being opposite the inside bearing, the outside bearing being proximate to a wheel of the trailer;
        a medial portion extending between the inside bearing and the outside bearing;
    a temperature monitoring mechanism being configured to monitor a temperature of the axle spindle and alert a user of the trailer of a temperature greater than a threshold temperature, the threshold temperature being at least greater than 180° F., the temperature monitoring mechanism including:
        a sleeve having an inner end opposite an outer end, the sleeve being configured to receive the axle spindle such that the medial portion is covered by the sleeve;
        a temperature sensor being affixed to the sleeve proximate to one of the inner end and the outer end;
        a battery being mounted within the sleeve, the battery being electrically coupled with the temperature sensor;
        an axle transceiver being in electronic communication with the temperature sensor;
        a central processing unit transceiver being in wireless electronic communication with the axle transceiver;
        a central processing unit module being in electronic communication with the central processing unit transceiver; and
        a warning light being in electronic communication with the central processing unit module, the warning light being mounted to an exterior surface of the trailer.

2. The temperature sensor system of claim 1, the axle spindle further comprising an inside bearing ring being mounted to the inside bearing and the axle, the inside bearing ring covering at least a portion of each of the axle spindle and the axle.

3. The temperature sensor system of claim 1, the axle spindle further comprising an outside bearing ring being mounted to the outside bearing, the outside bearing ring covering at least a portion of the outside bearing.

4. The temperature sensor system of claim 1, the axle spindle further comprising a retaining nut being affixed to the outside bearing opposite the medial portion.

5. The temperature sensor system of claim 1, wherein sleeve has a tapered tubular body such that a diameter of the inner end is larger than a diameter of the outer end, the inner end being proximate the inside bearing when the axle spindle is within the sleeve, the outer end being proximate the outside bearing when the axle spindle is within the sleeve.

6. The temperature sensor system of claim 1, the temperature sensor further comprising a pair of temperature sensors.

7. The temperature sensor system of claim 6, wherein a first of the pair of temperature sensors is affixed to the inner end and a second of the pair of temperature sensors is affixed to the outer end.

8. The temperature sensor system of claim 6, wherein each of the pair of temperature sensors is a ring, the ring wrapping around a circumference of a corresponding one of the inner end and the outer end.

9. The temperature sensor system of claim 1, wherein the battery is rechargeable.

10. The temperature sensor system of claim 9, the temperature monitoring mechanism further comprising a charging port being coupled with the battery, the charging port being positioned in the sleeve.

11. The temperature sensor system of claim 10, wherein the charging port is exposed within the inner end.

12. The temperature sensor system of claim 10, wherein the charging port is exposed within the outer end.

13. The temperature sensor system of claim 10, wherein the charging port configured to receive a USB charging cable.

14. The temperature sensor system of claim 1, wherein the warning light is mounted to the exterior surface on a front left-hand side, such that the warning light is visible to the user through a left side mirror when the user is in a driver's seat of the vehicle.

15. The temperature sensor system of claim 1, wherein the warning light is mounted to the exterior surface on a front side, such that the warning light is visible to the user through a side mirror when the user is in a driver's seat of the vehicle.

16. The temperature sensor system of claim 1, wherein the central processing unit module is configured to activate the warning light when the temperature sensor measures the temperature.

17. The temperature sensor system of claim 16, wherein the central processing unit module is configured to deactivate the warning light when the temperature sensor measures a reduced temperature, wherein the reduced temperature is less than 180° F.

18. The temperature sensor system of claim 1, wherein the central processing unit transceiver is in wireless electronic communication with the axle transceiver.

19. A temperature sensor system, comprising:
a vehicle having a trailer with a plurality of wheels, each of the plurality of wheels being rotatably mounted to an axle spindle, the axle spindle including:
  an inside bearing being proximate an axle;
  an inside bearing ring being mounted to the inside bearing and the axle, the inside bearing ring covering at least a portion of each of the axle spindle and the axle;
  an outside bearing being opposite the inside bearing, the outside bearing being proximate the each of the plurality of wheels;
  a medial portion extending between the inside bearing and the outside bearing;
  an outside bearing ring being mounted to the outside bearing, the outside bearing ring covering at least a portion of the outside bearing;
  a retaining nut being affixed to the outside bearing proximate to the each of the plurality of wheels, the retaining nut being opposite the outside bearing ring from the medial portion;
a temperature monitoring mechanism being configured to monitor a temperature of the axle spindle and alert a user of the vehicle of a temperature greater than a threshold temperature, the threshold temperature being at least greater than 180° F., the temperature monitoring mechanism including:
  a sleeve having an inner end opposite an outer end, the sleeve being configured to removably receive the axle spindle such that the medial portion is covered by the sleeve, the sleeve having a tapered tubular body wherein the inner end has a diameter that is larger than a diameter of the outer end, the inner end being proximate to the inside bearing when the axle spindle is within the sleeve, the outer end being proximate to the outside bearing when the axle spindle is within the sleeve;
  a pair of temperature sensors, a first of the pair of temperature sensors being affixed to the inner end, a second of the pair of temperature sensors being affixed to the outer end, each of the pair of temperature sensors being a ring, the ring wrapping around a circumference of a corresponding one of the inner end and the outer end;
  a rechargeable battery being electrically coupled with each of the pair of temperature sensors, the rechargeable battery being mounted within the sleeve;
  a charging port being coupled with the rechargeable battery, the charging port being positioned in the sleeve and being exposed within the inner end;
  an axle transceiver being mounted within the sleeve, the axle transceiver being coupled with the rechargeable battery, the axle transceiver being in electronic communication with each of the pair of temperature sensors;
  a central processing unit transceiver being in wireless electronic communication with the axle transceiver;
  a central processing unit module being in electronic communication with the central processing unit transceiver;
  a warning light being in electronic communication with the central processing unit module, the warning light being mounted to a front left exterior surface of the trailer, the warning light being visible to the user through a left side mirror of the vehicle when the user is in a driver's seat of the vehicle; and
the central processing unit module being configured to activate the warning light when at least one of the pair of temperature sensors measures the temperature, the central processing unit module being configured to deactivate the warning light when each of the pair of temperature sensors measures an operable temperature, wherein the operable temperature is less than 180° F.

\* \* \* \* \*